United States Patent [19]

Ranjith et al.

[11] Patent Number: 4,798,731

[45] Date of Patent: Jan. 17, 1989

[54] HEAT TREATMENT OF FRESH LIQUID MILK PRODUCTS

[75] Inventors: Heva M. P. Ranjith; Yin C. Thoo, both of Telford, England

[73] Assignee: Milk Marketing Board, Surrey, England

[21] Appl. No.: 771,671

[22] Filed: Sep. 3, 1985

[30] Foreign Application Priority Data

Sep. 3, 1984 [GB] United Kingdom ................ 8422212

[51] Int. Cl.$^4$ .............................................. A23C 3/02
[52] U.S. Cl. .................................... 426/522; 426/580; 426/587
[58] Field of Search ............... 426/521, 522, 590, 580, 426/587, 588

[56] References Cited

U.S. PATENT DOCUMENTS

| | | | |
|---|---|---|---|
| 3,117,879 | 1/1964 | Swanson . | |
| 3,201,245 | 8/1965 | Clark et al. | 426/801 |
| 3,973,048 | 8/1976 | Sollerud | 426/521 |
| 4,044,238 | 8/1977 | Emschermann | 426/521 |
| 4,461,780 | 7/1984 | Menacci | 426/522 |
| 4,534,936 | 8/1985 | Hastings | 426/522 |

FOREIGN PATENT DOCUMENTS

| | | |
|---|---|---|
| 1186732 | 2/1965 | Fed. Rep. of Germany . |
| 1085224 | 1/1955 | France . |
| 7208942 | 1/1973 | Netherlands . |

OTHER PUBLICATIONS

Berry 1985 Heating Characteristics of Homogeneous Milk-Based Formulas in Cans Processed in an Agitating Retort J. Food Sci. 50:209.
J. G. Zadow—Ultra-Heat Treatment of Dairy Products, C.S.I.R.O. (1975) 35, pp. 41–47.
Melkkunde "Een Inleiding in Samenstelling, Structuur en Eigenschappen van Melk", Landbouwhogeschool, Wageningen (1977), p. 183.
Journal of Food Protection, vol. 43, Mar. 1980, p. 220.
Koeltechniek 64 (1971) (7), pp. 136–138.
Journal of Applied Bacteriology (1976) 41, pp. 1–11.
Sporevormende Bacterien in Voedingsmiddelen, W. J. Kooiman, p. 92, PUDOC, Wageningen 1980.
By products from Milk (1970) pp. 239, 245.
Journal of Dairy Science, vol. 57, No. 3, pp. 280–284.
Brown et al., J. Soc. Dairy Technology, vol. 33, pp. 78–9 (1980).
Hermier et al., J. Dairy Research (1975) 42 437–444.
Schroeder J. Soc. Dairy Technology, vol. 36, pp. 43–44 (1983).
Franklin et al., J. Appl. BACT 21, 51–57 (1958).
Davies, J.FD. Technol. (1977) 12 115–129.
Neaves, Ph.D Thesus, University of Surrey, Jul. 1981, "Thermal Inactivation Kenetics of Bacterial Spores at Ultra High Temperatures with Particular Reference to Clostridium botulinum", pp. 32–35, 97–117, 127–131, 133, 134, 167–173.
Cheeseman et al., Nature, vol. 204, pp. 688–689 (1964).
Busta J. Dairy Science (1966), 49 751–756.
"Heat Penetration into Canned Foods", reprinted from FOOD, Dec., 1941 and Jan. 1942.
"The Lactulose Content and Colour of UHT and Sterilized Mil", Thesis by Geoffrey Robert Andrews, University of Reading, Apr., 1986.

Primary Examiner—Donald L. Czaja
Assistant Examiner—Carolyn Paden
Attorney, Agent, or Firm—Nixon & Vanderhye

[57] ABSTRACT

A process for the production of a liquid dairy product that is substantially free from micro-organisms that would bring about spoilage during storage of the untreated product at 10° to 30° C., which process comprises the steps of
(a) heating a liquid milk product to a temperature not exceeding 105° C.,
(b) heating the liquid milk product at a rate of at least 4.8° C. per second to a temperature above 105° C. and
(c) cooling the liquid milk product at a rate of at least 8.8° C. per second to a temperature below 110° C., the total time that the liquid milk product spends above 105° C. being such that the B* value of the complete heat treatment regime is not more than 1.01 and not less than about 0.5 and the C* value of the complete heat treatment regime is not more than 0.27.

16 Claims, 1 Drawing Sheet

HEAT TREATMENT OF FRESH LIQUID MILK PRODUCTS

This invention relates to an improved process for the heat treatment of liquid milk products including food products based on milk and containing starch or other carbohydrates. It is particularly concerned with a process for the treatment of fresh cream, fresh milk, skimmed milk, flavoured milk and other liquid milk products to prolong the shelf-life of such products.

It is well-known that the storage life of cream, milk and other liquid milk products is often very short when these products are stored at ambient temperature, e.g. 10° to 30° C., and that the shelf-life of such products can be prolonged by storing the products under refrigerated conditions, e.g. 5° to 10° C. Such refrigeration prolongs the shelf-life from perhaps 1 to 2 days up to perhaps 4 to 6 days but prolongations of shelf-life of this order of magnitude are of limited value industrially.

The deterioration in the quality of liquid milk products such as cream and milk is due to microbiological activity which normally develops within a few days storage to a level such that the product takes on unacceptable flavour characteristics and frequently undergoes unacceptable physical changes. The microbiological activity that gives rise to these unacceptable changes is not prevented by conventional pasteurisation treatment and it has been proposed to subject dairy products to higher temperature heat treatments in order to inhibit this microbiological activity. Such heat treatment may involve flash-heating to about 145° C., the so-called ultra high temperature (UHT) treatment. Products which have been heat-treated in this way have prolonged shelf-lives of several months but all such products suffer from the severe disadvantage that they lose their fresh taste and take on a characteristic taste which is less attractive to the consumer.

It has also been proposed to improve the keeping properties of fresh milk by subjecting the milk to a short-time heat treatment at 100°–145° C., preferably about 105° C., followed by packaging the heat-treated milk at a temperature of 70° to 80° C. and then subsequently cooling the packaged milk in a predetermined manner. From the practical point of view, we have found that, by operating at the preferred temperature of 105° C., no significant prolongation of shelf-life is obtained while if the product is given a conventional UHT treatment it immediately takes on the unacceptable "sterilized" flavour.

Consequently, there is still a need for a heat-treatment process which will inhibit the microbiological activity in liquid milk products especially fresh whole milk to an extent which will permit the product to be stored without refrigeration, for prolonged periods of time, e.g. in excess of 4 weeks, without microbial spoilage while at the same time avoiding the difficulties of the unacceptable "sterilized" flavour. The present invention is based upon our discovery that by careful selection of the heat-treatment temperature, it is possible to inhibit microbiological activity in the treated product when it is stored in sealed containers at 10° to 30° C. for long periods while, at the same time, producing a product which is free from the characteristic "sterilised" flavour and whose taste is indistinguishable from the fresh product.

In particular we have found that the deterioration in flavour due to heat treatment at up to 105° C. is relatively small compared with the damage inflicted by the higher temperatures needed to destroy the micro-organisms responsible for spoilage.

Accordingly the present invention provides a process for the production of a liquid milk product that is substantially free from micro-organisms that would bring about spoilage during storage of the untreated product at 10° to 30° C., which process comprises the steps of
 (a) heating a liquid milk product to a temperature not exceeding 105° C.,
 (b) heating the liquid milk product at a rate of at least 4.8° C. per second, for example at least 5° C. per second, to a temperature above 105° C. and
 (c) cooling the liquid milk product at a rate of at least 8.8° C. per second, for example at least 10° C. per second, to a temperature below 110° C., preferably to a temperature of 105° C. or less and more preferably at or below 90° C., the total time that the liquid milk product spends above 105° C. being such that the B* value (as herein defined) of the complete heat treatment regime is not more than 1.01, to not less than about 0.5 below which the process would not be economical and the C* value (as herein defined) of the complete heat treatment regime is not more than 0.27, for example about 0.14.

The term "B* value" used herein is a parameter indicating the bacteriological effect of a heat treatment and is derived, by graphical methods, from the time-temperature profile of the heat treatment. B* quantifies the destruction of the thermophilic spores, B* = 1 equates to a thermal death value of 9; i.e. the heat treatment reduces the number of thermophilic spores in a sample of the liquid milk product by a factor of $10^9$. The exact method for calculating the B* value is given in Kessler, H.G., Food Engineering and Dairy Technology, Verlag A. Kessler (1981) pages 180 to 182 and 198 to 200.

The term "C* value" used herein is a parameter indicating the chemical effect of a heat treatment as measured by the loss of thiamine from the liquid milk product. C* = 1 indicates that the heat treatment has caused a 3% loss of thiamine. The calculation of C* values is also set out in the above reference.

Suitably the liquid milk product is treated such that the $F_o$ value of the product is not more than 4.1, for example about 3.5 and not less than 1.7 below which the process would not achieve adequate destruction of micro-organisms.

The term "$F_o$" used herein is a further parameter measuring the lethality of a heat treatment to thermophilic spores. $F_o$ is also derived graphically as set out in the above reference at page 181. When a process has $F_o = 1$, the sum of all the lethal effects of the process is equivalent to the lethal effect of 1 minute at 121.1° C., assuming instantaneous heating to and instantaneous cooling from that temperature.

Without wishing to be bound by any theory, we believe that the flavour deterioration caused by heat treatment is a function of both the time spent above 105° C. and the maximum temperature to which the product is heated. Thus, for example, by using the specified minimum heating and cooling rates, temperatures in the range of 133° C. to 140° C. may be achieved without flavour deterioration providing that the holding time at the maximum temperature is of the order of 1 to 5 seconds. If higher rates of heating and/or cooling are employed then much higher temperatures and/or somewhat longer holding times may be achieved. Provided that the time-temperature profile is such that the specified B* and C* values are not exceeded the process produces a liquid milk product having prolonged shelf-life and an acceptable flavour.

The heating and cooling steps of the process of the invention may be effected using conventional apparatus as used in the food and dairy industries. One type of such apparatus is the direct heating plant in which high pressure potable steam is mixed with the liquid milk product either by injecting the steam into the liquid milk product of vice versa. The water added to the liquid milk product is then removed by evaporation, usually under reduced pressure and this also brings about the cooling. Indirect heating plants rely on heat exchangers usually in plate or tubular form in which the liquid milk product is heated by contact with one surface of the heat exchangers, the other surface of which is heated by steam or pressurized hot water. Cooling is effected in similar heat exchangers. Some heat may be conserved by recycling the heating/cooling liquid between the heating and cooling steps as appropriate. Indirect plants usually heat the liquid milk product in two or more steps and have a similar number of cooling steps. For the purposes of the present invention, at least when an indirect plant is employed, it is convenient to preheat the liquid milk product to near 105° C. in one or several steps prior to the final heating step and to cool the liquid milk product in one or several steps after the first cooling to below 110° C. thus enabling effective heat recycling between the heating and cooling sides of the plant. Thus, in step (c) the liquid milk product may be cooled directly to packaging temperature. Alternatively, and usually more conveniently, the cooling in step (c) is to a temperature just below 110° C. and a subsequent post-cooling step is included to bring the temperature down to packaging temperature. In a modification of an indirect heating plant the final heating step may be performed by ohmic heating instead of using the more usual plate or tube heat exchanger for this step.

In order to ensure a satisfactory product with a long shelf life it is advisable to use high quality milk; preferably only milk having not more than $1 \times 10^5$ viable microbial counts per ml is used and suitably the milk has a pH of not less than 6.7, preferably about 6.75 or 6.8.

A liquid milk product which has been treated according to the present invention may be packaged in a conventional manner or may be submitted to further processing steps such as in the production of milk-based carbohydrate-containing food products, in conventional manner.

The invention will now be illustrated by reference to the figures of the drawings in which.

EXAMPLES

Figure 1:
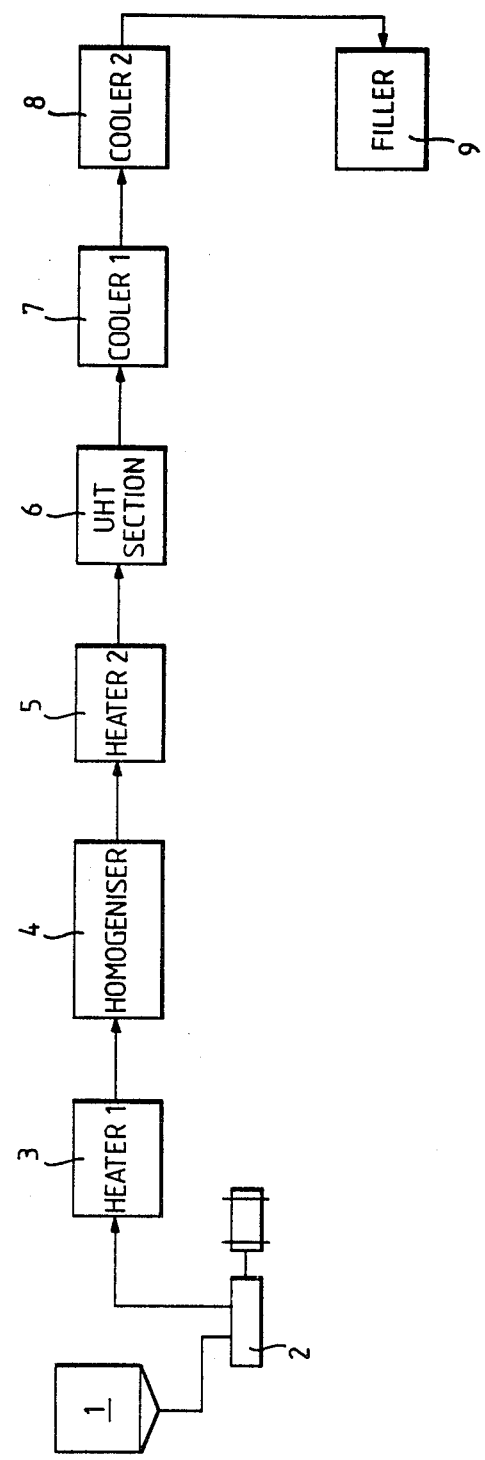
FIG. 1 shows, in schematic form, an apparatus for conducting the heat treatment according to the invention.

Referrng to FIG. 1, fresh whole milk is stored in a vat 1 and then pumped by pump 2 through indirect heat-exchanger 3 (Heater 1) where it is heated, then through an homogeniser 4 and through a second heat-exchanger 5 (Heater 2) where further heating is accomplished. The milk is then passed through UHT Section 6 where it is rapidly heated to a temperature of 133° C. or higher. From the UHT Section 6 the milk passes through indirect heat-exchangers 7 and 8 (Coolers 1 and 2) where it is progressively cooled and then to a filling device 9 where it is packaged under aseptic conditions for consumption. Probes (not shown) monitor the temperature of the milk leaving heat-exchangers 5, 6 and 7. The mean residence time distribution (RTD) in heat-exchangers 5, 6 and 7 is as follows:

|  | Heater 2 | UHT Section | Cooler 1 |
| --- | --- | --- | --- |
| RTD | 6.67 sec. | 6.66 sec. | 3.77 sec |

Figure 2:
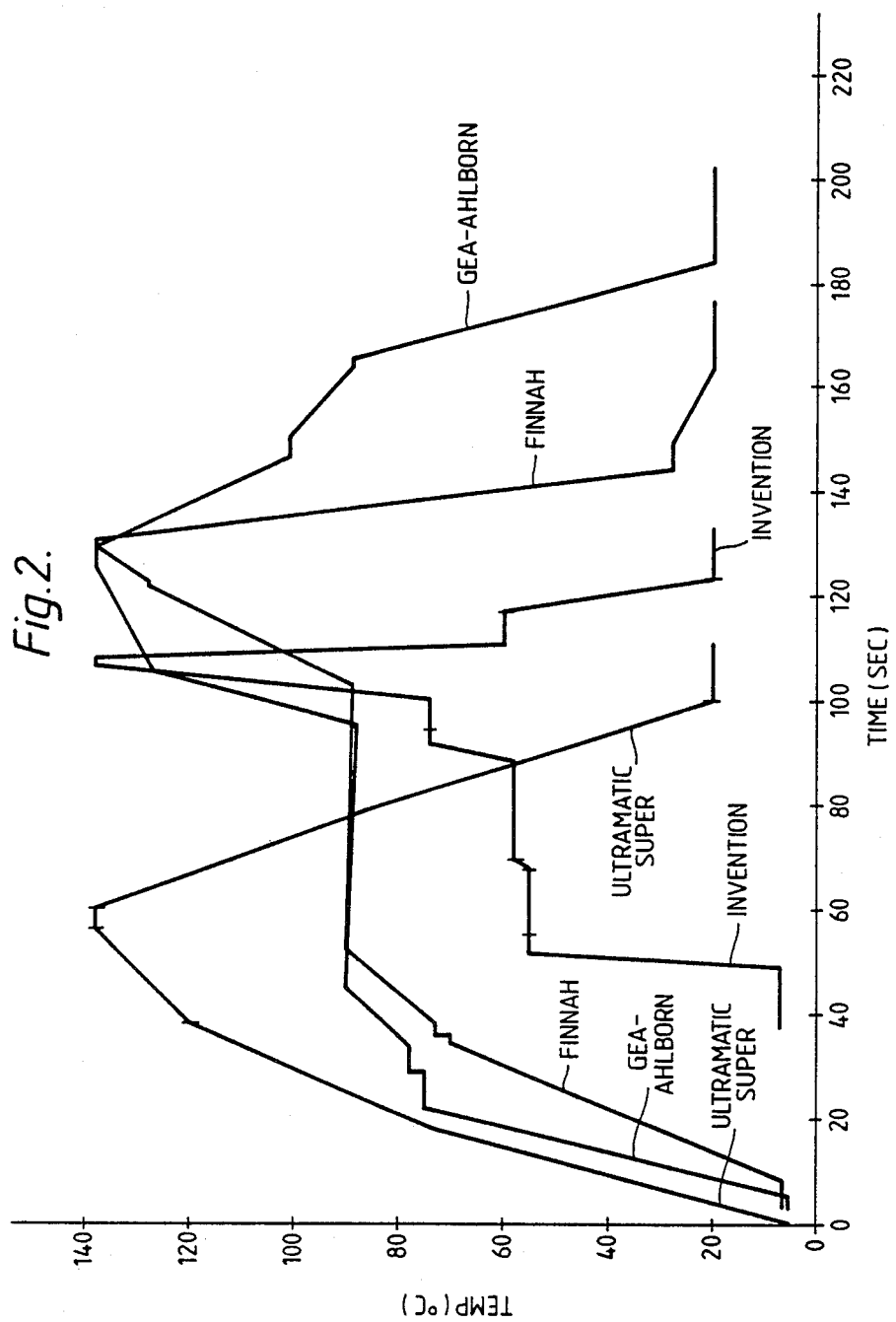
FIG. 2 is a graph showing the time-temperature profiles of various heat treatment processes used for commercial UHT milk production and a typical profile of a heat treatment process according to the invention.

The apparatus is run in a manner that in the UHT Section 6 the milk is heated from a temperature of 105° C. or below at 4.8° C. $s^{-1}$ and is cooled to a temperature of 110° C. or below at 8.8° C. $s^{-1}$ in cooler 1. The apparatus may be operated to vary the temperature achieved in each heat-exchanger and the holding time at UHT temperature. A typical time-temperature profile for the present heat treatment process is shown in FIG. 2.

EXAMPLES 1 AND 2

Using the apparatus described above, fresh whole milk was heated according to the following details:

| | Temperature (°C.) on exiting heat exchangers | | | | | Holding time |
| --- | --- | --- | --- | --- | --- | --- |
| Example | Heater 1 | Heater 2 | UHT Section | Cooler 1 | Cooler 2 | time @ UHT(s) |
| 1 | 72.5 | 104 | 140 | 107 | 17.5 | 1.7 |
| 2 | 72.5 | 104 | 140 | 57.5 | 17.5 | 1.7 |

The milk was then filled into pots. Samples of the treated milk were tasted by a panel of 18 experienced tasters and compared with a commercially available long-life milk product which had been processed through a conventional APV Ultramatic UHT plant. The time-temperature profile of the heat treatment process employed in an APV ultramatic plant is shown in FIG. 2.

Each taster was presented with two samples of the milk from each of Examples 1 and 2 and two samples of the commercial long-life product. Each sample was evaluated by smell and taste and scored by marking a line. For analysis of the results the lines were assigned the nominal linear scale of from 0 ("Extremely unacceptable") to 150 ("Extremely acceptable"). Analysis of variance of the acceptability scores yielded the following means scores for each milk:

| Milk | Ex. 1 | Ex. 2 | Long-Life |
| --- | --- | --- | --- |
| Mean score | 100.5 | 104.4 | 74.8 |

The standard error of differences based on the "panellist x milk" interaction was: SED (38df)=6.90. The standard deviations for replicate assessments on the same milk by the same panelist was 25.1.

The acceptabilty of the long-life milk was at least 25% below that of the other two milks tasted on the same day, (P<0.001).

The panellists were also asked to assess each sample for various defects, 14% of long-life samples tasted stale, a defect which was not found in any sample of the milks according to Examples 1 and 2 (P<0.01) and 64% of the long-life samples were reported to be 'cooked' compared with 28% and 22% in the milks of Examples 1 and 2 respectively (P<0.001). [Tests of statistical significance are based on $X^2$ values derived from analyses of deviance].

We claim:

1. A ultra-high temperature treatment process for the production of a liquid milk product whereby said milk product is substantially free from micro-organisms that would bring about spoilage during storage of the untreated product at 10° to 30° C., which process comprises the steps of
   (a) heating a liquid milk product to a temperature not exceeding 105° C.,
   (b) cooling said liquid milk product at a rate of at least 4.8° C. per second to a temperature above 105° C. and
   (c) cooling said liquid milk product at a rate of at least 8.8° C. per second to a temperature below 110° C., the total time that said liquid milk product spends above 105° C. being such that the B* value of the complete heat treatment regime is not more than 1.01 and not less than about 0.5 and the C* value of the complete heat treatment regime is not more than 0.27.

2. A process according to claim 1 wherein heating in step (b) is conducted at a rate of at least 5° C. per second.

3. A process according to claim 1 wherein cooling in step (c) is conducted at a rate of at least 10° C. per second.

4. A process according to claim 2 wherein cooling in step (c) is conducted at a rate of at least 10° C. per second.

5. A process according to claim 1 wherein said liquid milk product is cooled, in step (c) to a temperature of 105° C. or less.

6. A process according to claim 4 wherein said liquid milk product is cooled, in step (c) to a temperature of 105° C. or less.

7. A process according to claim 1 wherein said liquid milk product is cooled, in step (c) to a temperature of 90° C. or less.

8. A process according to claim 6 wherein said liquid milk product is cooled, in step (c) to a temperature of 90° C. or less.

9. A process according to claim 1 wherein the C* value of the complete heat treatment regime is about 0.14.

10. A process according to claim 8 wherein the C* value of the complete heat treatment regime is about 0.14.

11. A process according to claim 1 wherein said liquid milk product is treated such that the $F_o$ value of the product is not more than 4.1 and not less than 1.7.

12. A process according to claim 10 wherein said liquid milk product is treated such that the $F_o$ value of the product is not more than 4.1 and not less than 1.7.

13. A process according to claim 1 wherein said liquid milk product is fresh cow's milk.

14. A process according to claim 12 wherein said liquid milk product is fresh cow's milk.

15. A process according to claim 8 wherein the milk, prior to treatment has not more than $1 \times 10^5$ viable microbial counts per ml and a pH not less than 6.7.

16. A process according to claim 14 wherein the milk, prior to treatment has not more than $1 \times 10^5$ viable microbial counts per ml and a pH not less than 6.7.

* * * * *